(12) United States Patent
Iwamura

(10) Patent No.: US 12,554,905 B2
(45) Date of Patent: Feb. 17, 2026

(54) SIMULATION APPARATUS, RECORDING MEDIUM, AND SIMULATION METHOD

(71) Applicant: OMRON Corporation, Kyoto (JP)

(72) Inventor: Shintaro Iwamura, Kyoto (JP)

(73) Assignee: OMRON Corporation, Kyoto (JP)

(*) Notice: Subject to any disclaimer, the term of this patent is extended or adjusted under 35 U.S.C. 154(b) by 1041 days.

(21) Appl. No.: 17/635,003

(22) PCT Filed: Mar. 4, 2020

(86) PCT No.: PCT/JP2020/009130
§ 371 (c)(1),
(2) Date: Feb. 14, 2022

(87) PCT Pub. No.: WO2021/053855
PCT Pub. Date: Mar. 25, 2021

(65) Prior Publication Data
US 2022/0292234 A1 Sep. 15, 2022

(30) Foreign Application Priority Data
Sep. 17, 2019 (JP) .................. 2019-168020

(51) Int. Cl.
*G06F 30/20* (2020.01)
*B25J 9/16* (2006.01)
*G05B 19/4155* (2006.01)

(52) U.S. Cl.
CPC .......... *G06F 30/20* (2020.01); *B25J 9/1671* (2013.01); *G05B 19/4155* (2013.01); *G05B 2219/40269* (2013.01); *G05B 2219/50391* (2013.01)

(58) Field of Classification Search
CPC .......... G06F 30/20; B25J 9/1671; B25J 9/16; G05B 19/4155; G05B 2219/40269;
(Continued)

(56) References Cited

U.S. PATENT DOCUMENTS

| 2013/0035789 A1 | 2/2013 | Takeda |
|---|---|---|
| 2013/0218542 A1 | 8/2013 | Yerli |

(Continued)

FOREIGN PATENT DOCUMENTS

| CN | 106896790 | 6/2017 |
|---|---|---|
| JP | H10275007 | 10/1998 |

(Continued)

OTHER PUBLICATIONS

Zhang N, Shang W, Cong S. Dynamic trajectory planning for a spatial 3-DoF cable-suspended parallel robot. Mechanism and Machine Theory. Apr. 1, 2018;122:177-96. (Year: 2018).*

(Continued)

*Primary Examiner* — Chuen-Meei Gan
(74) *Attorney, Agent, or Firm* — JCIPRNET

(57) ABSTRACT

In the present invention, the behavior of devices and the accessory devices of the devices is simulated. This apparatus comprises a first behavior calculation unit that calculates the behavior of a first object in a virtual space corresponding to a first device to which an accessory device is attached and a second behavior calculation unit that calculates the behavior of a second object in a virtual space corresponding to a second device. The second device includes an accessory device. At each predetermined time step, the first behavior calculation unit calculates, in the time step, the behavior of the first object corresponding to the first device to which the accessory device is attached, and then the second behavior calculation unit calculates the behavior of the accessory device attached to the first device on the basis of the calculated behavior of the first object.

20 Claims, 9 Drawing Sheets

(58) Field of Classification Search
CPC ........ G05B 2219/50391; G05B 19/056; G05B 2219/40515; G05B 19/05; G05B 17/02
See application file for complete search history.

(56) References Cited

U.S. PATENT DOCUMENTS

| | | | |
|---|---|---|---|
| 2017/0165841 A1 | 6/2017 | Kamoi | |
| 2017/0235300 A1* | 8/2017 | Maruno | ............. G06T 7/74 700/112 |
| 2021/0178578 A1* | 6/2021 | Nakai | ............. B25J 9/1671 |

FOREIGN PATENT DOCUMENTS

| | | |
|---|---|---|
| JP | 2000163392 | 6/2000 |
| JP | 2006099310 | 4/2006 |
| JP | 2009265668 | 11/2009 |
| JP | 2013004060 | 1/2013 |
| JP | 2013191128 | 9/2013 |
| JP | 2016042378 | 3/2016 |
| JP | 2018069377 | 5/2018 |
| JP | 2018103339 | 7/2018 |
| JP | 2019067285 | 4/2019 |
| JP | 2019081242 | 5/2019 |
| WO | 2013136930 | 9/2013 |
| WO | 2016193781 | 12/2016 |

OTHER PUBLICATIONS

"Decision of Refusal of Japan Counterpart Application", issued on Mar. 25, 2025, with English translation thereof, p. 1-p. 5.

"Decision on Rejection of China Counterpart Application", issued on Jul. 23, 2024, with English translation thereof, p. 1-p. 22.

"International Search Report (Form PCT/ISA/210) of PCT/JP2020/009130," mailed on Jun. 2, 2020, with English translation thereof, pp. 1-4.

"Written Opinion of the International Searching Authority (Form PCT/ISA/237)" of PCT/JP2020/009130, mailed on Jun. 2, 2020, with English translation thereof, pp. 1-8.

Office Action of China Counterpart Application, with English translation thereof, issued on Dec. 19, 2023, pp. 1-19.

"Office Action of Japan Counterpart Application", with English translation thereof, issued on Jul. 30, 2024, pp. 1-8.

"Office Action of Japan Counterpart Application" with English translation thereof, issued on Mar. 7, 2023, p. 1-p. 10.

Pedro Neto, J. Norberto Pires et al. "Robot Path Simulation: a Low Cost Solution Based on CAD", 2010 IEEE Conference on Robotics, Automation and Mechatronics, Jun. 28, 2010, pp. 333-338.

"Search Report of Europe Counterpart Application", issued on Sep. 1, 2023, pp. 1-10.

* cited by examiner

SIMULATION APPARATUS, RECORDING MEDIUM, AND SIMULATION METHOD

CROSS-REFERENCE TO RELATED APPLICATION

This application is a 371 application of the International PCT application serial no. PCT/JP2020/009130, filed on Mar. 4, 2020, which claims the priority benefits of Japan Patent Application No. 2019-168020, filed on Sep. 17, 2019. The entirety of each of the above-mentioned patent applications is hereby incorporated by reference herein and made a part of this specification.

TECHNICAL FIELD

The present disclosure relates to a simulation apparatus, a simulation program, and a simulation method which are capable of estimating a behavior of a robot installed in a virtual space.

BACKGROUND ART

Simulation using a computer has been applied to various technical fields. By using simulation, it is possible to perform preliminary study of various events even in the absence of an actual apparatus. As an example in which such simulation is used for factory automation (FA), for example, Patent Literature 1 (Japanese Patent Laid-Open No. 2016-042378) discloses integration simulation of a mechanical system including a visual sensor in a real space corresponding to a virtual imaging part.

CITATION LIST

Patent Literature

[Patent Literature 1]
Japanese Patent Laid-Open No. 2016-042378

SUMMARY OF INVENTION

Technical Problem

In integration simulation disclosed in Japanese Patent Laid-Open No. 2016-042378, a virtual work in a virtual space is handled by a virtual robot in the virtual space corresponding to a robot in a real space. Practically, in the case of an industrial robot, high versatility of the robot can be achieved by replacing an accessory device (also referred to as an end effector) which is mounted on a tip end of a robot arm with a device of a type according to a work or a process. Patent Literature 1 does not disclose simulation of a device including an accessory device mounted on a device such as such a robot.

An objective of the present disclosure is to provide a configuration in which behaviors of a device and an accessory device mounted on the device can be simulated.

Solution to Problem

A simulation apparatus according to the present disclosure is a simulation apparatus that calculates a behavior of a device, the simulation apparatus including a first behavior calculation unit configured to calculate a behavior of a first target disposed in a virtual space corresponding to a first device equipped with an accessory device, and a second behavior calculation unit configured to calculate a behavior of a second target in the virtual space corresponding to a second device. The second device includes the accessory device. The first behavior calculation unit calculates a behavior of the first target corresponding to the first device equipped with the accessory device in a predetermined time step for each time step, and then the second behavior calculation unit calculates a behavior of the accessory device mounted on the first device based on the calculated behavior of the first target.

According to the above-described disclosure, it is possible to calculate behaviors of the first device and the accessory device mounted on the first device in the same virtual space and simulate the behaviors. In addition, the simulation is executed in the same time step, and thus the behaviors can be simulated in synchronization with each other.

In the above-described disclosure, the accessory device includes a device that adds an operation function of operating a work to the first device by being mounted thereon.

According to the above-described disclosure, as the accessory device, it is possible to simulate a behavior of the device that provides a work operation function of the first device.

In the above-described disclosure, the second behavior calculation unit includes a physical simulator.

According to the above-described disclosure, it is possible to provide a behavior calculation unit of the second device by diverting the physical simulator without changing the first behavior calculation unit.

In the above-described disclosure, the first device includes a robot, and the first behavior calculation unit executes emulation of a robot program having an instruction code for causing the robot to operate a work.

According to the above-described disclosure, the first behavior calculation unit can be realized by an emulator of a robot program for controlling a robot in order to calculate a behavior of the robot.

In the above-described disclosure, the behavior of the first target which is calculated by the first behavior calculation unit includes a position of the first target in the virtual space, and the physical simulator calculates the behavior of the second targe in accordance with physical computation using the position of the first target which is calculated by the first behavior calculation unit.

According to the above-described disclosure, a behavior of the second target can be calculated on the basis of the behavior of the first target which is calculated through physical computation by the physical simulator in the same time step.

In the above-described disclosure, the physical simulator performs the physical computation by invalidating generation of a force in the second target.

According to the above-described disclosure, in a case where the physical simulator calculates a behavior of the second target by physical computation, a force component is set to zero in the physical computation. Thus, even when the behavior of the second target is calculated by physical computation, the behavior can be calculated as a value which is not affected by a force component.

In the above-described disclosure, the behavior calculated for the second target corresponding to the accessory device includes a position of the second target in the virtual space, and the second behavior calculation unit further detects a collision between the position of the second target in the virtual space and a position of a predetermined target in the virtual space.

According to the above-described disclosure, the second behavior calculation unit can detect a collision between a target corresponding to the accessory device and another predetermined target in a virtual space.

In the above-described disclosure, the simulation apparatus further includes a third behavior calculation unit configured to calculate a behavior of a third target disposed in a virtual space corresponding to a third device, the third device operates in associates with the first device while exchanging data with the first device, and the simulation apparatus acquires the data exchanged between the first device and the third device from a real machine provided in a production line.

According to the above-described disclosure, in a case where a behavior of a target corresponding to the third device operating in association with the first device while exchanging data with the first device is calculated, the exchanged data can be acquired from a real machine. Thereby, it is possible to simulate a behavior of the first device or the third device in association with a real machine being in operation in a production line.

In the above-described disclosure, the accessory device includes a cable that is able to be mounted on the first device.

According to the above-described disclosure, it is possible to realize simulation including a behavior of a target corresponding to the cable that can be mounted on the first device.

In the above-described disclosure, the simulation apparatus further includes an image generation part configured to generate an image obtained by visualizing the virtual space.

According to the above-described disclosure, behaviors of simulation targets including the first device and the second device can be visualized and reproduced in a virtual space.

According to another aspect of the present disclosure, a simulation program for causing a computer to execute a method of calculating a behavior of a device is provided. The simulation program includes a first behavior calculation step of calculating a behavior of a first target disposed in a virtual space corresponding to a first device equipped with an accessory device, and a second behavior calculation step of calculating a behavior of a second target in the virtual space corresponding to a second device. The second device includes the accessory device. A behavior of the first target corresponding to the first device equipped with the accessory device is calculated in the first behavior calculation step at a predetermined time step for each time step, and then a behavior of the accessory device mounted on the first device is calculated based on the behavior of the first target calculated in the second behavior calculation step.

According to the above-described disclosure, when the simulation program is executed, behaviors of the first device and the accessory device mounted on the first device in the same virtual space are calculated, and thus the behaviors can be reproduced (simulated). In addition, the simulation is executed in the same time step, and thus the behaviors can be simulated in synchronization with each other.

According to still another aspect of the present disclosure, a simulation method of calculating a behavior of a device is provided. The simulation method includes a first step of calculating a behavior of a first target disposed in a virtual space corresponding to a first device equipped with an accessory device, and a second step of calculating a behavior of a second target in the virtual space corresponding to a second device. The second device includes the accessory device. A behavior of the first target corresponding to the first device equipped with the accessory device is calculated in the first step at a predetermined time step for each time step. Then, in the second step, a behavior of the accessory device mounted on the first device is calculated based on the behavior of the first target calculated in the first step.

According to the simulation method of the above-described disclosure, behaviors of the first device and the accessory device mounted on the first device in the same virtual space are calculated, and thus the behaviors can be reproduced (simulated). In addition, the simulation is executed in the same time step, and thus the behaviors can be simulated in synchronization with each other.

DESCRIPTION OF EMBODIMENTS

Figure 1:
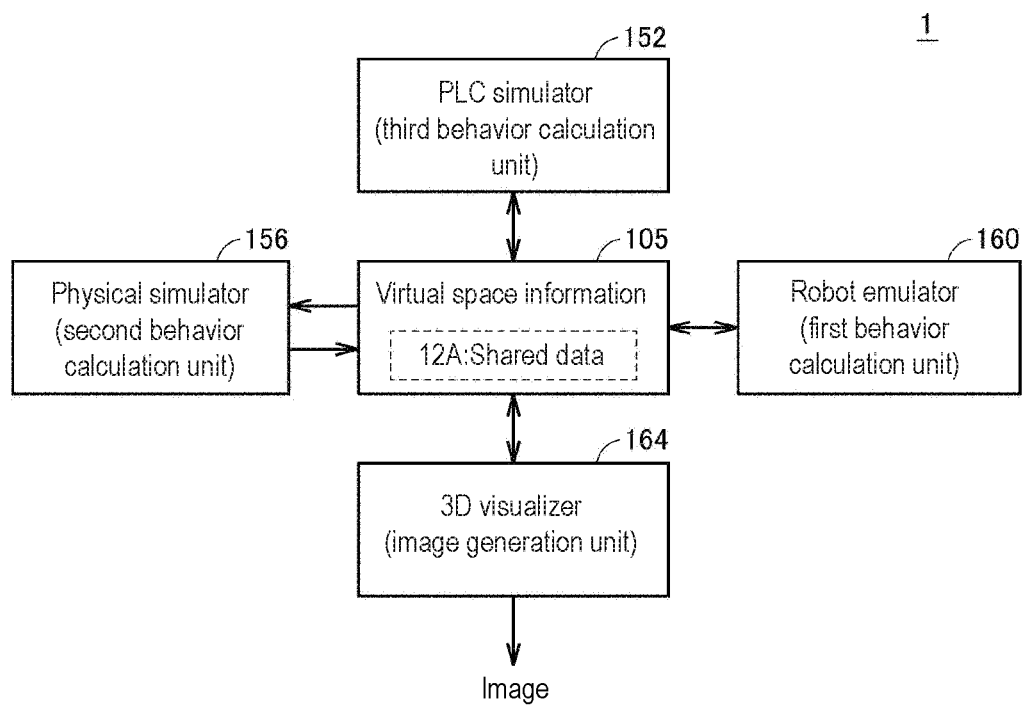
FIG. 1 is a schematic diagram illustrating an application example of a simulation apparatus 1 according to the present embodiment.

An embodiment of the present disclosure will be described in detail with reference to the drawings. Note that the same or equivalent portions in the drawings will be denoted by the same reference numerals and signs, and the description thereof will not be repeated.

A. Application Example

First, an example of a scene to which the present invention is applied will be described.

A simulation apparatus 1 according to the present embodiment is a simulation apparatus that estimates a behavior of a system controlling a plurality of devices provided in an FA. The plurality of devices is not limited, and may include a robot that operates in cooperation with a programmable logic controller (PLC) and an accessory device that is mounted on the robot to operate together with the robot. Such an accessory device includes a device that adds an operation function of operating a work to the robot by being mounted. For example, an end effector typically includes a robot hand which is detachably provided in an arm of the robot. The simulation apparatus 1 is not limited, but is applicable to, for example, an application for performing "pick-and-place" in which a robot hand handles a work. The "work" may be any one such as a final product or a part thereof, or an intermediate product or a part thereof, as long as the position thereof can be tracked. Meanwhile, the simulation apparatus 1 can also be applied to, for example, an application for performing assembly of works by a robot hand.

The "pick-and-place" represents a series of operations of grasping, transporting, and arranging performed by a robot, the series of operations including causing the robot to grasp a work in a predetermined tracking area when a transported work reaches the tracking area, transport the grasped work to a predetermined area, and arrange the work in the predetermined area.

A transport part for transporting a work is typically a conveyor, but is not limited thereto. The PLC controls an actuator for driving the conveyor. Examples of the actuator include a servomotor in the present embodiment.

FIG. 1 is a schematic diagram illustrating an application example of the simulation apparatus 1 according to the present embodiment. Referring to FIG. 1, the simulation apparatus 1 includes virtual space information 105 for defining a virtual space and an object disposed in the virtual space. Behaviors of objects in the virtual space are calculated, and thus the contents of the virtual space information 105 are appropriately updated. The virtual space information 105 includes shared data 12A to be described later.

The simulation apparatus 1 includes a PLC simulator 152 that calculates a behavior of a transport part of a work in a virtual space, a robot emulator 160 that calculates a behavior of a robot disposed in the virtual space, a physical simulator 156 that calculates a behavior of a robot hand mainly mounted on the robot, and a 3-dimensional (3D) visualizer 164.

The PLC simulator 152 calculates a behavior of a target (hereinafter, referred to as an object) corresponding to a device related to the transport of a work in a virtual space, such as a conveyor, and outputs an operation instruction according to the calculated behavior. The device related to the transport of a work is not limited, and includes a driving device of a conveyor. A tray for placing a work is placed on a transport surface of a conveyor belt. The device related to the transport of these works is equivalent to a third device, such an object, disposed in a virtual space, which corresponds to the device related to the transport of the works is equivalent to a third target, and the PLC simulator 152 is equivalent to a third behavior calculation unit.

The robot emulator 160 calculates a behavior of an object in a virtual space which corresponds to a robot handling a work, on the basis of the operation instruction output from the PLC simulator 152. The robot is equivalent to a first device, the object corresponding to the robot is equivalent to a first target, and the robot emulator 160 is equivalent to a first behavior calculation unit.

The physical simulator 156 calculates a behavior of an object in a virtual space which corresponds to a robot hand mounted on the robot, on the basis of the behavior of the object in the virtual space which is calculated by the PLC simulator 152 and the robot emulator 160. The robot hand is equivalent to a second device, the object corresponding to the robot hand is equivalent to a second target, and the physical simulator 156 is equivalent to a second behavior calculation unit.

The 3D visualizer 164 generates an image obtained by visualizing a virtual space in which an object is disposed. In the present embodiment, the 3D visualizer 164 generates an image for displaying each object on a display on the basis of the virtual space information 105, for example, in a three-dimensional virtual space. The 3D visualizer 164 is equivalent to an image generation part.

In the simulation apparatus 1, for example, the first behavior calculation unit (robot emulator 160) calculates a behavior of an object, disposed in a virtual space, which corresponds to a robot for each predetermined time step set by a user, and then the second behavior calculation unit (physical simulator 156) calculates a behavior of an object in the virtual space which corresponds to a robot hand mounted on the robot, on the basis of the calculated behavior of the robot. Thereby, it is possible to estimate a behavior of the robot itself in the virtual space and a behavior of the robot hand mounted on the robot in the virtual space. In addition, a behavior of the object in the virtual space which corresponds to the robot is calculated in a certain time step, and a behavior of the object in the virtual space which corresponds to the robot hand is calculated on the basis of the calculated behavior.

The simulation apparatus 1 associates these components and modules with each other. Thereby, even when a real system is not present, the simulation apparatus 1 can estimate a behavior of each device which may occur when a work is processed, with respect to the first device and the second device mounted on the first device in the real system.

According to FIG. 1, since the physical simulator 156 and the robot emulator 160 are synchronized with each other in a time step, it is possible to synchronize a behavior calculated each time simulation is executed, whereby an accurate tact time can be estimated by simulation.

B. Example of Target System

Figure 2:
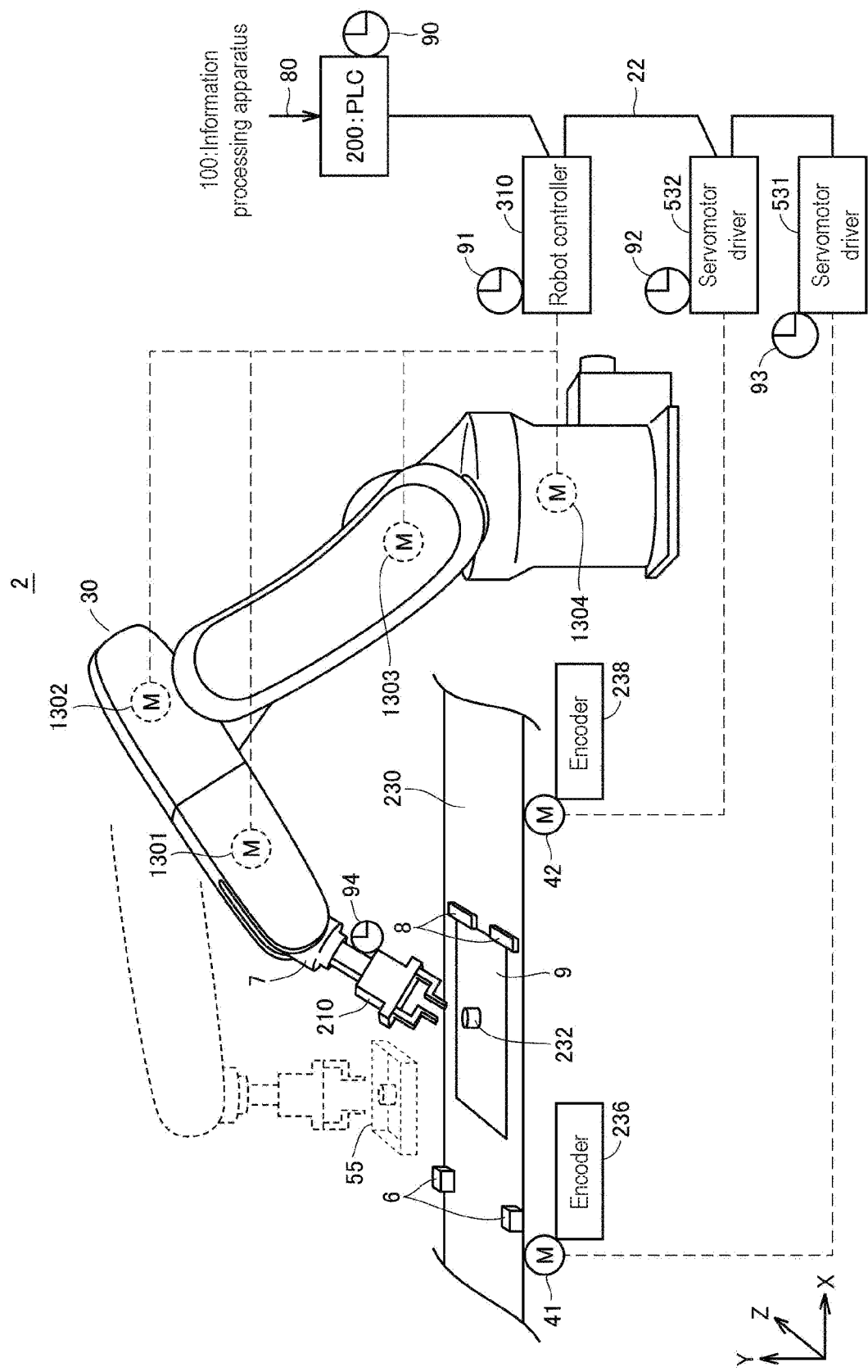
FIG. 2 is a diagram illustrating an example of the appearance of a device, which is a target for simulation according to the present embodiment, in association with a control system.

The simulation apparatus 1 estimates a behavior of a device which is a real machine controlled by the control system 2 in FIG. 2 which is provided in a production line. In this manner, examples of a target device for which a behavior is estimated include a movable conveyor 230 and a robot 30 in the embodiment, but a target machine is not limited thereto. In the robot 30, a robot hand 210 is detachably mounted at a tip end of an arm through a connector 7. The robot hand 210 includes a plurality of types such as a parallel hand, a multi-finger hand, and a multi-finger joint hand. The type of robot hand 210 is not limited thereto, and may also include, for example, a type of picking and placing a work 232 by a suction type. The robot hand 210 of a type corresponding to the work 232 or a step is mounted on the robot 30.

The robot 30 picks the work 232 placed on a tray 9 on the conveyor 230 by the robot hand 210, moves the work 232 to a table 55 at a predetermined position while picking the work 232, and places the work 232 on the table 55. In the robot hand 210, hand opening and closing operations for picking or placing the work 232 are controlled in response to a control instruction received from a robot controller 310 to be described later.

The control system 2 further includes a photoelectric sensor 6 and an openable stopper 8 in relation to the conveyor 230. The photoelectric sensor 6 detects that the tray 9 provided on a transport surface of the conveyor 230 has arrived in front of a predetermined work tracking area. The stopper 8 performs a closing operation to stop (fix) the tray 9 that has arrived in the tracking area. The simulation apparatus 1 performs simulation of devices provided in these real machines.

FIG. 2 is a diagram illustrating an example of the appearance of a device, which is a target for simulation according to the present embodiment, in association with a control system. Referring to FIG. 2, the control system 2 includes an information processing apparatus 100, a PLC 200, a robot controller 310 that controls the robot 30, and servomotor drivers 531 and 532. The information processing apparatus 100 includes a terminal apparatus such as a personal computer (PC) or a tablet terminal. The servomotor drivers 531 and 532 drive corresponding servomotors 41 and 42.

The information processing apparatus 100 is connected to the PLC 200 through a network 80 to be described later. Any wired or wireless communication means can be adopted as the network 80. The PLC 200 and the information processing apparatus 100 performs communication in accordance with, for example, a universal serial bus (USB). The information processing apparatus 100 provides a simulation environment for simulating a behavior of the control system 2, an environment for designing a control program for controlling the robot 30 and a machine related to transport, and the like. The control program may be designed using results of simulation. The control program designed on the information processing apparatus 100 is transmitted to the PLC 200 through a field network.

The PLC 200 executes the designed control program and gives a target value to the robot controller 310 or each of the servomotor drivers 531 and 532 in accordance with execution results to control the robot 30, a machine related to the transport of the conveyor 230, and the like.

The robot controller 310 and the servomotor drivers 531 and 532 are connected to the PLC 200. The PLC 200, the robot controller 310, and the servomotor drivers 531 and 532 are connected to each other by a daisy chain through the field network 22. For example, Ether CAT (registered trademark) is adopted as the field network 22. However, the field network 22 is not limited to Ether CAT.

Similarly, the servomotor drivers 531 and 532 drive the servomotors 41 and 42 of the conveyor 230, Encoders 236 and 238 are disposed at rotation axes of the servomotors 41 and 42. The encoders output positions (rotation angles), rotation speeds, accumulated rotation counts, and the like of the servomotors to the PLC 200 as feedback values of the servomotors 41 and 42.

The robot 30 and the conveyor 230 move the work 232 in association with each other. Meanwhile, here, for the sake of simplicity of description, the movement of the work 232 will be described, but the present invention is not limited to movement. For example, processing using the robot 30 of the work 232 placed on the tray 9 may be performed.

In FIG. 2, as an example of a drive apparatus of the robot 30, servomotors 1301, 1302, 1303, and 1304 (hereinafter, also referred to as robot servomotors) provided in the robot 30, and the robot controller 310 driving the robot servomotors are illustrated. Similarly, as an example of a drive apparatus of the conveyor 230, the servomotor drivers 531 and 532 that drive the servomotors 41 and 42 provided in the conveyor 230 are illustrated. By the driving of the robot 30, a behavior of the robot 30 changes in a three-dimensional space constituted by an X-axis a Y-axis and a Z-axis orthogonal to each other. By the driving of the conveyor 230, a behavior of the conveyor 230 is defined in the same three-dimensional space as that of the robot 30, but the behavior is defined, for example, in a plane constituted by an X-axis and a Y-axis.

The drive apparatus is not limited to the servo drivers, and a drive apparatus corresponding to a motor which is a driven apparatus is adopted. For example, in a case where an induction motor or a synchronous motor is driven, an inverter drive or the like may be adopted as the drive apparatus.

The robot controller 310 drives the robot servomotors of the robot 30. An encoder (not illustrated) is disposed at a rotation axis of each of the robot servomotors. The encoder outputs the position (rotation angle), rotation speed, accumulated rotation counts, and the like of the servomotor to the robot controller 310 as feedback values of the robot servomotor.

C. Control and Position of Virtual Space

Control of the robot 30 and the conveyor 230 in the control system 2 will be described with reference to FIG. 2. As described above, the robot 30 and the conveyor 230 include a movable part which is movable by a plurality of driving shafts. These driving shafts are driven by the servomotors. Specifically, the robot 30 includes a plurality of arms that are driven by the rotation f the robot servomotors (the servomotors 1301 to 1304). The robot servomotors rotate to drive the corresponding arms. The robot controller 310 controls the driving of the robot servomotors, and thus the arms are three-dimensionally driven. By the driving of such arms, a behavior of the robot 30 is realized. Similarly, in the conveyor 230, the conveyor 230 and the tray 9 on the transport surface are moved by the rotation of the servomotors 41 and 42. The amount of movement (the speed, direction, distance, and the like of the movement) is determined depending on the rotation amounts (direction and angle of rotation) of the servomotors 41 and 42. By the driving of the servomotors 41 and 42, behaviors of devices such as the conveyor 230 and the tray 9 are realized.

In the embodiment, virtual axes are associated with the arms of the robot 30, and the position of the robot 30 is determined from the positions of the axes. The control system 2 controls the axes of the robot 30 in accordance with a target position that changes in time series. Thereby, the speed and trajectory of movement of each arm change so as to become a speed and trajectory following a target.

The target position of the robot 30 is stored in advance in, for example, the PLC 200. The robot controller 310 receives the target position from the PLC 200, determines rotation amounts of the robot servomotors on the basis of the received target position, and outputs instruction values for designating the determined rotation amounts to the robot servomotors.

(c1. Coordinate System of Three-Dimensional Virtual Space)

An example of a process of calculating the positions of the axes equivalent to the arms of the robot 30 according to the present embodiment in a three-dimensional virtual space will be described. In the present embodiment, as a coordinate system in a three-dimensional virtual space, a world coordinate system included in parts such as the robot 30 and the PLC 200 in common is illustrated. When a position in the world coordinate system is calculated, a rotation amount of the servomotor 1301 is indicated by $\alpha A$, a rotation amount of the servomotor 1302 is indicated by $\alpha B$, a rotation amount of the servomotor 1303 is indicated by $\alpha C$, and a rotation amount of the servomotor 1304 is indicated by $\alpha D$ in the present embodiment. Computation is performed on the rotation amounts ($\alpha A$, $\alpha B$, $\alpha C$, $\alpha D$) of the servomotors using a predetermined function, and thus the rotation amounts ($\alpha A$, $\alpha B$, $\alpha C$, $\alpha D$) of the servomotors can be converted into the positions of xyz in a three-dimensional virtual space. FIG. 2 illustrates, for example, three-dimensional coordinates P(x, y, z) which are a positon in a world coordinate system corresponding to a three-dimensional virtual space of the axis of an arm picking the work 232, but three-dimensional coordinates corresponding to other axes can be similarly calculated. Thus, a behavior of the robot 30 in the three-dimensional virtual space can be shown by time-series changes of the three-dimensional coordinates P(x, y, z) of each arm.

Further, in the embodiment, for the sake of simplicity of description, three-dimensional coordinates P(x, y, z) of the axis of an arm picking the work 232 are used to calculate the position of an object corresponding to the robot hand 210 for detecting a "collision" in a three-dimensional virtual space to be described later. Meanwhile, for the detection of such a "collision", three-dimensional coordinates P(x, y, z) of another axis may be used, or a combination of three-dimensional coordinates P(x, y, z) of two or more axes may be used.

Similarly to the robot 30, the conveyor 230 changes in time series so that a behavior of the conveyor 230 indicates a target behavior, and the speed and trajectory of movement of the conveyor 230 indicate a target position. The target position of the conveyor 230 is stored in the PLC 200 in advance.

The servomotor drivers 531 and 532 determine rotation amounts of the servomotors 41 and 42 on the basis of the target position from the PLC 200, and output instruction values for designating the determined rotation amounts to the servomotors 41 and 42. By performing computation on the rotation amounts of the servomotors 41 and 42 using a predetermined function, the position of the conveyor 230 can also be converted into three-dimensional coordinates Q (x, y, 0) in a world coordinate system corresponding to the same three-dimensional virtual space as that of the robot 30. It is possible to indicate a behavior of the conveyor 230 in a three-dimensional virtual space by time-series changes of the three-dimensional coordinates Q (x, y, 0). In the present embodiment, the position of the tray 9 placed on the transport surface of the conveyor 230 and the position of the work 232 disposed in the tray 9 are determined from the position of the conveyor 230 in the three-dimensional virtual space.

Meanwhile, here, the conveyor 230 shows a behavior in a plane, and thus the z-axis of the three-dimensional coordinates Q is fixed to a value of 0, but other fixed values may be used.

(c2. Control of Time Synchronization)

Time synchronization in the control system 2 will be described with reference to FIG. 2. In the control system 2, a plurality of devices connected to the field network 22, that is, the PLC 200, the robot controller 310, the servomotor drivers 531 and 532, and the robot hand 210 each includes timers 90 to 94 that are time-synchronized with each other, and a transmission/reception timing of data including a control instruction is synchronized between the devices by the devices operating on the basis of the timers. This timer is equivalent to a counter that is synchronously incremented or decremented.

Meanwhile, in the present embodiment, a "timing" represents the concept of a time, a period of time, or the time when some event occurs. In addition, "time synchronization" refers to synchronization of timers, time data, and the like of each other's apparatuses.

D. Overall Configuration of Control System

Figure 3:
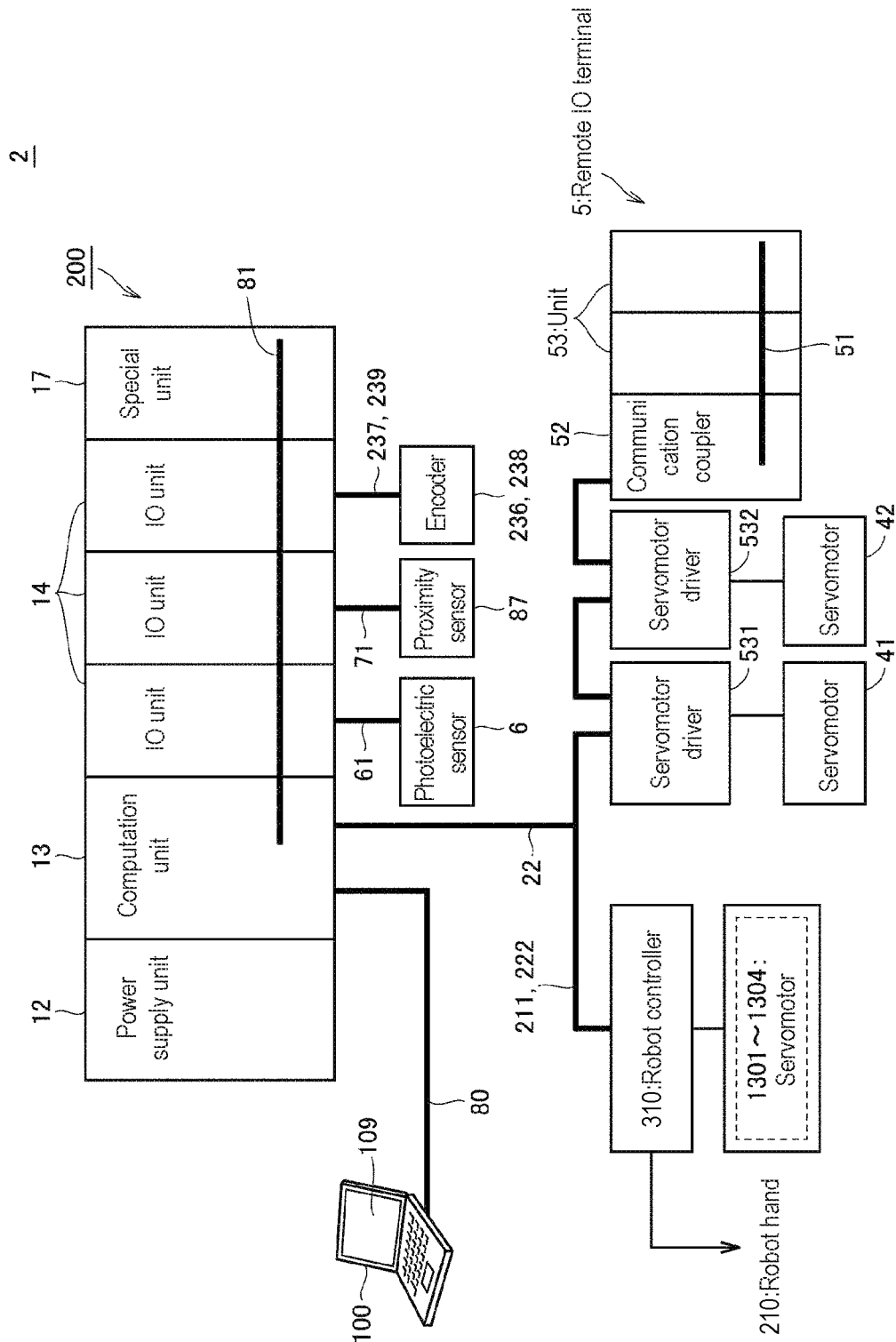
FIG. 3 is a schematic diagram illustrating an example of a unit configuration of a control system 2 according to the present embodiment.

FIG. 3 is a schematic diagram illustrating an example of a unit configuration of the control system 2 according to the present embodiment. In FIG. 3, the overall configuration of the control system 2 having the configuration illustrated in FIG. 2 is shown.

Referring to FIG. 3, the control system 2 includes the PLC 200, the servomotor drivers 531 and 532 and a remote IO terminal 5 that are connected to the PLC 200 through the field network 22, the robot controller 310, and for example, a photoelectric sensor 6, a proximity sensor 87 included in a stopper 8, and encoders 236 and 238 which are IO devices provided in a field.

The PLC 200 includes a computation unit 13 that executes main computation processing, one or more IO units 14, and a special unit 17. These units are configured to be able to exchange data with each other through a system bus 81, and receive the supply of power from a power supply unit 12. The simulation apparatus 1 is connected to the computation unit 13.

The IO unit 14 collects detected values 61, 71, 237, and 239 from the IO devices including the photoelectric sensor 6, the proximity sensor 87 of the stopper 8, the encoders 236 and 238, and the like. The proximity sensor 87 detects that the tray 9 has approached the stopper 8 within a predetermined distance in a non-contact manner. The detected value from each IO device is set (written) in, for example, a corresponding bit of a memory included in the IO unit 14. The computation unit 13 executes computation of a control program using values collected by the IO unit 14 and sets (writes) a value of a computation result in a corresponding bit of the IO unit 14. Peripheral devices or the IO device operate with reference to values of bits of the IO unit 14. In this manner, the PLC 200 can control the robot 30 or the conveyor 230 which is a control target while exchanging data with the IO device and the peripheral devices through the IO unit 14.

The special unit 17 has a function such as input and output of analog data, temperature control, and communication based on a specific communication method, the function not being supported in the IO unit 14.

The robot controller 310, the servomotor drivers 531 and 532, and the remote IO terminal 5 may be connected to the field network 22. Similarly to the IO unit 14, the remote IO terminal 5 basically performs processing related to general input and output processing. More specifically, the remote IO terminal 5 includes a communication coupler 52 for performing processing related to data transmission through the field network 22, and one or more IO units 53. These units are configured to be able to exchange data with each other through the remote IO terminal bus 51.

The servomotor drivers 531 and 532 are connected to the computation unit 13 through the field network 22 and drive the servomotors 41 and 42 in accordance with an instruction value received from the computation unit 13. Specifically, the servomotor drivers 531 and 532 receive instruction values such as a position instruction value, a speed instruction value, and a torque instruction value from the PLC 200 at a fixed cycle such as a control cycle synchronized with the timer 90. The computation unit 13 generates the instruction values on the basis of the detected values 237 and 239 received from the encoders 236 and 238.

The computation unit 13 causes the robot 30 to perform pick-and-place by executing a predetermined control program with reference to the above-described detected values received from the IO device. Specifically, when the computation unit 13 detects that the work 232 has approached a predetermined tracking area on the basis of the detected value 61 of the photoelectric sensor 6 and the detected value 71 of the proximity sensor 87, a control instruction 211 for a robot arm to perform pick-and-place and a control instruction 222 for the robot hand 210 are generated and are output to the robot 30 through the robot controller 310. When the control instruction 211 is generated, a state value of the robot 30 is referred to, in addition to the detected values 61 and 71 received from the above-described IO devices.

E. Hardware Configuration

Next, an example of a hardware configuration of the simulation apparatus 1 according to the present embodiment will be described.

Figure 4:
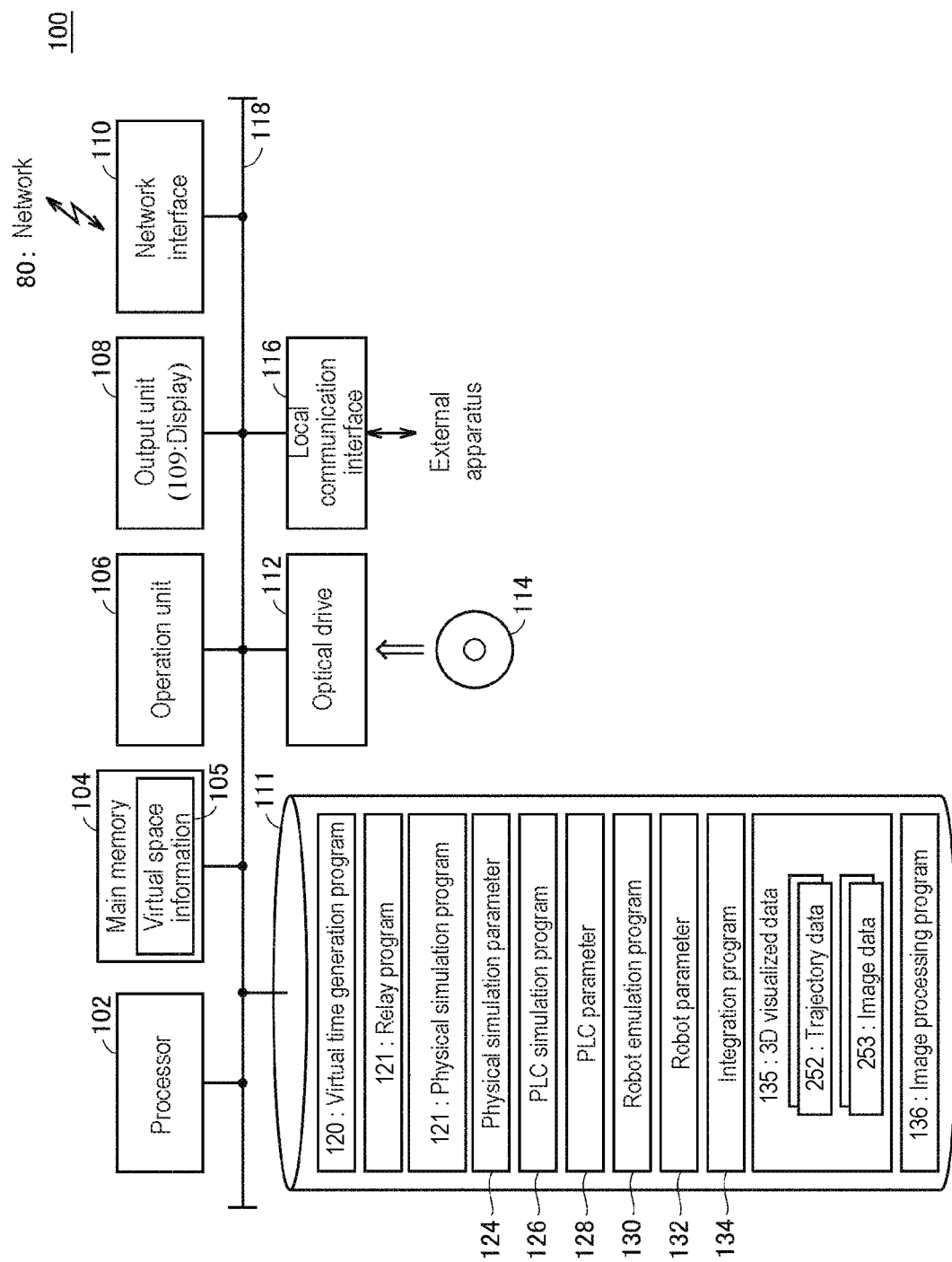
FIG. 4 is a schematic diagram illustrating an example of a hardware configuration for realizing the simulation apparatus 1 according to the present embodiment.

FIG. 4 is a schematic diagram illustrating an example of a hardware configuration for realizing the simulation apparatus 1 according to the present embodiment. The simulation apparatus 1 is realized by the information processing apparatus 100 as illustrated in FIG. 4 executing necessary programs.

The information processing apparatus 100 includes a processor 102 that executes an operating system (OS) and various programs to be described later, a main memory 104 that provides a work region for storing data required to execute a program in the processor 102, an operation unit 106 (operation reception part) that receives a user's operation such as a keyboard or a mouse, a display 109, an output unit 108 that outputs processing results of various indicators, a printer, and the like, a network interface 110 which is connected to various networks including the network 80, an optical drive 112, a local communication interface 116 that communicates with an external apparatus, and a storage 111 as main components. These components are connected to be able to communicate data to each other through an internal bus 118 or the like.

The information processing apparatus 100 reads various programs from a computer-readable recording medium 114 using the optical drive 112 and installs the programs in the storage 111 or the like, the computer-readable recording medium 114 including an optical recording medium (for example, a digital versatile disc (DVD) or the like) that non-transitorily stores computer-readable programs.

The various programs executed in the information processing apparatus 100 may be installed through the computer-readable recording medium 114, but may be installed by being downloaded from a servo apparatus or the like, not illustrated in the drawing, on a network through the network interface 110.

The storage 111, which is constituted by, for example, a hard disk drive (HDD), a flash solid state drive (SSD), or the like, stores programs executed by the processor 102. Specifically, the storage 111 stores a virtual time generation program 120, a relay program 121, a physical simulation program 122, a PLC simulation program 126, a robot emulation program 130, and an integration program 134 as simulation programs for realizing simulation according to the present embodiment. The storage 111 further stores an image processing program 136 for generating an image displaying an object disposed in a virtual space.

The virtual time generation program 120 generates virtual time for simulation. The simulation apparatus 1 executes simulation at a cycle based on virtual time.

The physical simulation program 122 calculates a behavior of an object corresponding to a device that operates in relation to the movement of the work 232. The device for which a behavior of the corresponding object is calculated by the physical simulation program 122 includes, for example, the photoelectric sensor 6, the conveyor 230, the tray 9, the stopper 8, and the robot hand 210 that are related to the transport or movement of the work 232. The physical simulation program 122 is given physical simulation parameters 124 including a parameter for defining the behavior of the object corresponding to the device and a parameter for defining the weight, shape, or the like of the work 232. The values of the physical simulation parameters 124 may be appropriately changed by a user's operation, the integration program 134, or the like.

As the physical simulation parameters 124, computer aided design (CAD) data of the work 232 and the device related to the transport or movement of the work 232 may be used. By using the CAD data, a behavior of a real device can be more accurately reproduced using an object.

The PLC simulation program 126 calculates positions of the device and the work 232 for which a behavior of a corresponding object is calculated by the physical simulation program 122. The calculated positions are given to the physical simulation program 122. The PLC simulation program 126 is given a PLC parameter 128 including parameters required to calculate the above-described positions.

The robot emulation program 130 functions as a simulator that reproduces a behavior of the robot 30 by an object. The robot emulation program 130 reproduces pick-and-place of the work 232 which is performed by the robot 30, on the basis of results (a behavior of an object) calculated by the physical simulation program 122. The robot emulation program 130 is given a robot parameter 132 including parameters required to reproduce a behavior of the robot 30 by the corresponding object.

The relay program 121 provides a relay function for the physical simulation program 122 and the robot emulation program 130 to exchange each other's data. The relay program 121 is not limited, but is described by a script instruction.

The integration program 134 executes processing for associating the physical simulation program 122, the PLC simulation program 126, the robot emulation program 130, and the relay program 121 with each other. Specifically, the integration program 134 typically generates and updates the virtual space information 105 describing the state of an object in a virtual space on the main memory 104. The physical simulation program 122, the PLC simulation program 126, and the robot emulation program 130 executes processing of each simulation with reference to (by reading) the virtual space information 105 and reflects necessary information, among the execution results, in the virtual space information 105. A behavior and processing of a device in the control system 2 including a device transporting the work 232 and the robot 30 moving the work 232 by pick-and-place are reproduced using a function provided by the integration program 134.

The image processing program 136 is given 3D visualized data 135 to be displayed on the display 109 on the basis of the virtual space information 105. The 3D visualized data 135 includes trajectory data 252 and image data 253. The image data 253 includes data for drawing an object corresponding to a simulated device, and the trajectory data 252 includes three-dimensional coordinates P(x,y,z) calculated by performing computation using a predetermined function on the position of each device indicated by the virtual space information 105, and time-series data of the three-dimensional coordinates P(x,y,z). The image processing program 136 generates image data for three-dimensionally drawing behaviors of target objects of the work 232, the device and the robot 30 related to the transport of the work 232, and the robot hand 210 mounted on the robot 30 in a three-dimensional virtual space using the 3D visualized data 135, and outputs the generated image data to the display 109. Thereby, an object is displayed on the display 109 in accordance with a behavior calculated by simulation, and a behavior of the device of the control system 2 is reproduced. Meanwhile, the image data 253 may include CAD data and the like.

An example in which the simulation apparatus 1 is realized by a single information processing apparatus 100 is illustrated in FIG. 4, but the simulation apparatus 1 may be realized by connecting a plurality of information processing apparatuses. In this case, some of processes required to realize the simulation apparatus 1 may be executed by the information processing apparatus 100, and the remaining processes may be executed by a servo (cloud) or the like on a network.

An example in which the simulation apparatus 1 is realized by the processor 102 executing one or a plurality of programs is illustrated in FIG. 4, but some of processes and functions required to realize the simulation apparatus 1 may be mounted using an application specific integrated circuit (ASIC), a field-programmable gate array (FPGA), or the like.

F. Functional Configuration

Figure 5:
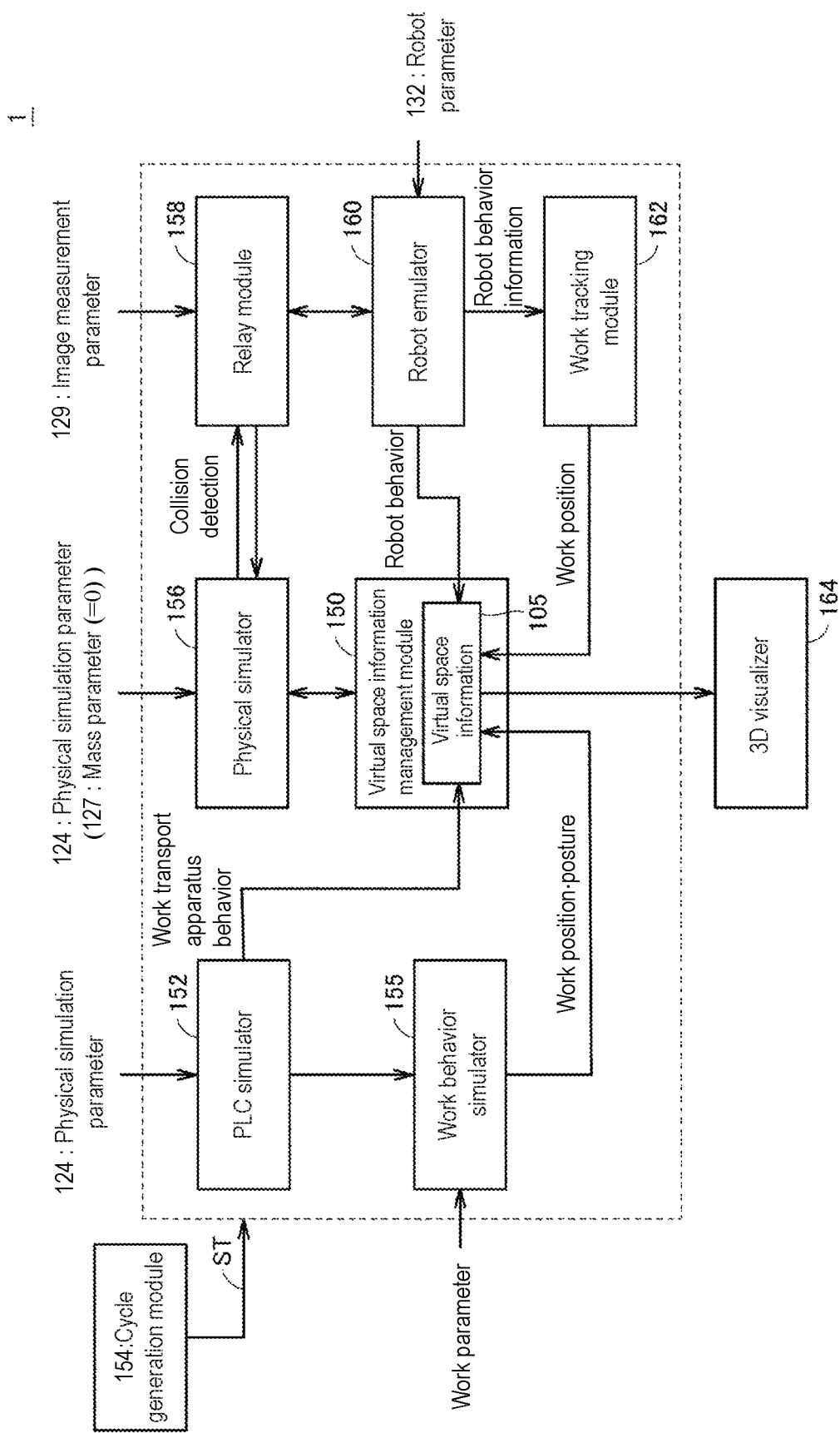
FIG. 5 is a schematic diagram illustrating an example of a functional configuration for realizing the simulation apparatus 1 according to the present embodiment.

Next, an example of a functional configuration of the simulation apparatus 1 according to the present embodiment will be described. FIG. 5 is a schematic diagram illustrating an example of a functional configuration for realizing the simulation apparatus 1 according to the present embodiment. Functions illustrated in FIG. 5 are typically realized by causing the processor 102 of the information processing apparatus 100 to execute programs (the virtual time generation program 120, the relay program 121, the physical simulation program 122, the PLC simulation program 126, the robot emulation program 130, the integration program 134, the image processing program 136, and the like).

Referring to FIG. 5, the simulation apparatus 1 includes a virtual space information management module 150, a PLC simulator 152, a cycle generation module 154, a physical simulator 156, a relay module 158, a robot emulator 160, and a 3D visualizer 164 as equipped functions.

The virtual space information management module 150 is realized by executing the integration program 134 (FIG. 4), and manages the virtual space information 105 for defining information of behaviors (position, posture, and the like) of objects in a virtual space in which simulation is performed.

The PLC simulator 152 is realized by executing the PLC simulation program 126 (FIG. 4) and calculates a behavior of an object corresponding to a device related to the transport of the work 232 in accordance with the physical simulation parameters 124. Information calculated by the PLC simulator 152 is reflected in the virtual space information 105.

The PLC simulator 152, which is a program for estimating a behavior of a device related to the transport of the work 232, is equivalent to a simulation program including a plurality of commands included in a PLC program. The plurality of commands may include an instruction group for controlling a behavior of a device related to transport which is included in the PLC program. The PLC program is written in a program language described in, for example, a cyclic execution type language (for example, a ladder language).

Whenever these commands of the PLC simulator 152 are executed on the basis of the data of the virtual space information 105, for example, an instruction value for controlling the servomotors 41 and 42 of the conveyor 230 is generated and stored in the virtual space information 105. Such an instruction value is indicated as shared data 12A (FIG. 1).

The robot emulator 160 calculates a behavior of the robot 30 that moves the work 232 disposed in a virtual space. More specifically, the robot emulator 160 is realized by executing the robot emulation program 130 (FIG. 4) on the basis of the robot parameter 132. Information of the behavior of the robot 30 which is calculated by the robot emulator 160 is reflected in the virtual space information 105. The robot emulator 160 performs simulation by regarding the arm of the robot 30 and the robot hand 210 mounted at the tip end thereof as an integrated rigid body.

Specifically, the robot program 130 includes a command group included in a program of the robot controller 310. The command group includes an instruction of a robot program having an instruction code for causing the robot 30 to operate the work 232. These instructions include a command for calculating a target trajectory of the robot 30 on the basis of the shared data 12A (including output data of the PLC simulator 152) of the virtual space information 105 and calculating an instruction value indicating a behavior of each axis on the basis of the calculated trajectory, and the like, and the like.

When a command of the robot emulator 160 is executed on the basis of data of the virtual space information 105 (including output data received from the PLC simulator 152), an instruction value for each axis of the robot 30 is generated and is stored as data in the virtual space information 105. Such an instruction value is indicated as shared data 12A (FIG. 1).

In this manner, instruction values generated by the PLC simulator 152 and the robot emulator 160 may indicate estimated behaviors of the robot 30 and a device (the servomotors 41 and 42 of the conveyor 230, or the like) related to the transport of the work 232 of the conveyor 230. In addition, each of the PLC simulator 152 and the robot emulator 160 calculates a new instruction value on the basis of the instruction value calculated by the other through the shared data 12A of the virtual space information 105. Thus, mutually associated operations of the robot 30 and the device related to the transport of the work 232 may be indicated by a behavior of the servomotor estimated by the instruction value calculated in this manner.

The work behavior simulator 155 calculates behaviors of objects of one or a plurality of works 232 disposed in a virtual space. Specifically, the work behavior simulator 155 is realized by executing the physical simulation program 122 (FIG. 4). The work behavior simulator 155 calculates a behavior of the work 232 disposed in a virtual space in accordance with information of a behavior of an object corresponding to a transport device of the work 232 which is calculated by the PLC simulator 152, and updates the behavior using calculation results. The work behavior simulator 155 calculates the position, posture, moving speed, moving direction, and the like of the work 232 at the time of calculating a behavior of the work 232. The position and posture of the work 232 are calculated on the basis of work parameters that are arbitrarily set by a user or the like. Information on the position and posture of the work 232 which are calculated by the work behavior simulator 155 is reflected in the virtual space information 105. The work parameters can also be included in the physical simulation parameters 124.

The physical simulator 156 is realized by executing the physical simulation program 122 (FIG. 4). The physical simulator 156 calculates behaviors (the position, posture, moving speed, moving direction, and the like) of objects corresponding to a device for transporting or moving the work 232 in accordance with the physical simulation parameters 124, and detects a collision between these objects in a virtual space. A collision detection result is output to the PLC simulator 152 or the robot emulator 160.

The physical simulator 156 detects whether or not a collision between objects has occurred, on the basis of a positional relationship between the objects which is calculated in a virtual space. The "collision" includes, for example, a fact that distance of both coordinates P of an object in a virtual space and coordinates Q of another object are, for example, specific distances including a distance equal to or less than a threshold value. Alternatively, the "collision" includes a fact that a trajectory connecting the coordinates P and the next-order coordinates P intersect a trajectory connecting the coordinates Q corresponding to the coordinates P and the next-order coordinates Q. The threshold value is a value based on the size (width, height, and the like) of each object. For example, the threshold value or the sizes of the objects may be included in the physical simulation parameters 124. Meanwhile, a positional relationship for detecting a "collision" is not limited to these positional relationships.

Figure 6:
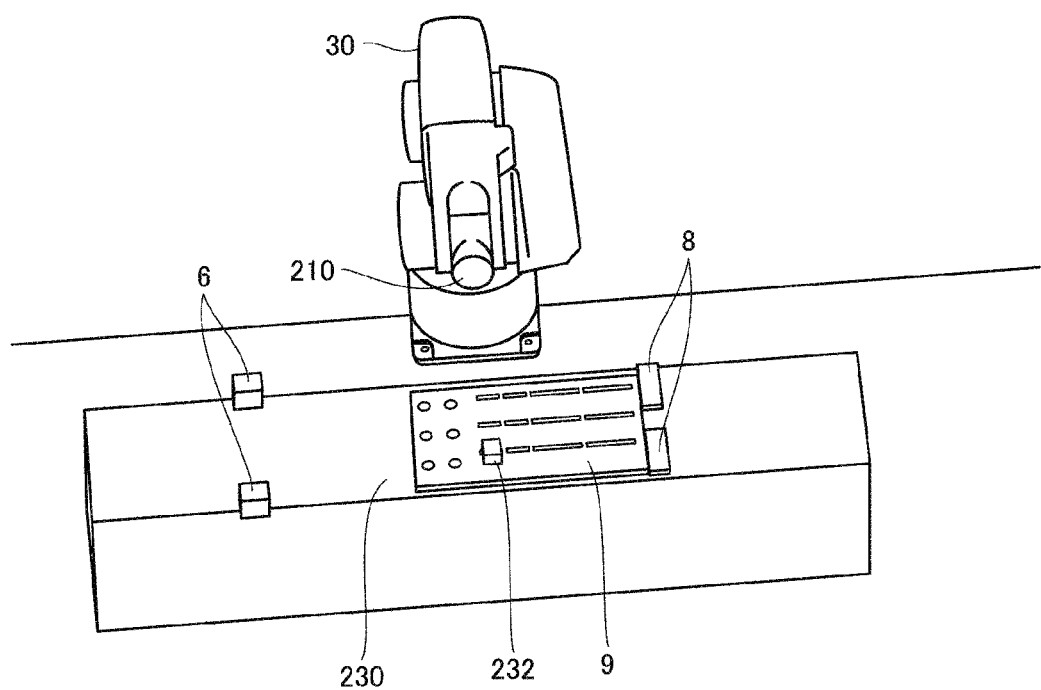
FIG. 6 is a diagram illustrating a simulation target of a physical simulator 156 according to the present embodiment.

FIG. 6 is a diagram illustrating a simulation target of the physical simulator 156 according to the present embodiment. The physical simulator 156 calculates a behavior, and objects between which a collision is detected include the photoelectric sensor 6, the stopper 8, the tray 9, the robot hand 210, the conveyor 230, and the work 232 as illustrated in FIG. 6. The physical simulator 156 calculates behaviors such as the positions and postures of the objects in accordance with predetermined physical computation, and detects a collision between the objects on the basis of the calculated behaviors such as the positions. The physical simulator 156 sets a mass parameter 127 of the object, among parameters to be used for the physical computation, to zero and performs computation.

The meaning of setting a mass to zero is as follows. That is, in a case where the mass parameter 127 is not zero, the physical simulator 156 calculates components of mechanical actions on each object such as a velocity, an acceleration, and a gravity based on the mass of the object by physical computation, and the physical simulator 156 calculates (updates) the position of the object in the next time step using the calculated components of the mechanical actions. On the other hand, in the present embodiment, the PLC simulator 152 and the robot emulator 160 determine (control) the position of each object. Thus, in order to set (that is, invalidate) an update component of the position of the object by the physical simulator 156 to zero, the mass parameter 127 of each object used for the physical computation of the physical simulator 156 is set to zero in the simulation apparatus 1.

Regarding objects of which the positions (behaviors) are calculated by setting masses to zero by physical computation, the speeds, accelerations, gravities, and the like thereof are also set to zero. Accordingly, even when these objects collide with each other, a mechanical component (components such as object bounce, for example, repulsion) is calculated as zero (invalidated) in physical computation, and thus the collision between the objects can be detected on the basis of the positions of the objects in which a mechanical action is invalidated.

The work tracking module 162 is realized by executing the robot emulation program 130, and tracks the work 232 which is picked-and-placed by the robot 30 in a virtual space, on the basis of behavior information of the robot 30 received from the robot emulator 160. Positional information (work position) of the work 232 tracked by the work tracking module 162 is reflected in the virtual space information 105.

The 3D visualizer 164 is equivalent to an image generation part that generates an image obtained by visualizing a virtual space. The 3D visualizer 164 visualizes behaviors of objects (the work 232, a device related to the transport of the work 232, the robot 30, the robot hand 210, and the like) in a virtual space on the basis of the virtual space information 105 managed by the virtual space information management module 150.

The cycle generation module 154 is realized by executing the virtual time generation program 120. The cycle generation module 154 outputs a signal ST which is synchronized with an output of a timer (not illustrated) included in the processor 102 to other parts, on the basis of the output of the timer. The parts execute processing or programs in synchronization with a cycle at which the signal ST is output from the cycle generation module 154 (hereinafter, referred to as a predetermined time step). Thereby, the parts in FIG. 5 are executed in synchronization with each other for each predetermined time step. The cycle of the signal ST may be determined on the basis of a communication cycle of the field network 22 of the control system 2 (hereinafter, also referred to as a "control cycle") in FIG. 3.

It is possible to reproduce behaviors of a system (for example, the control system 2) which is a simulation target with high accuracy by associating the functions as illustrated in FIG. 5 with each other.

G. Simulation

Figure 7:
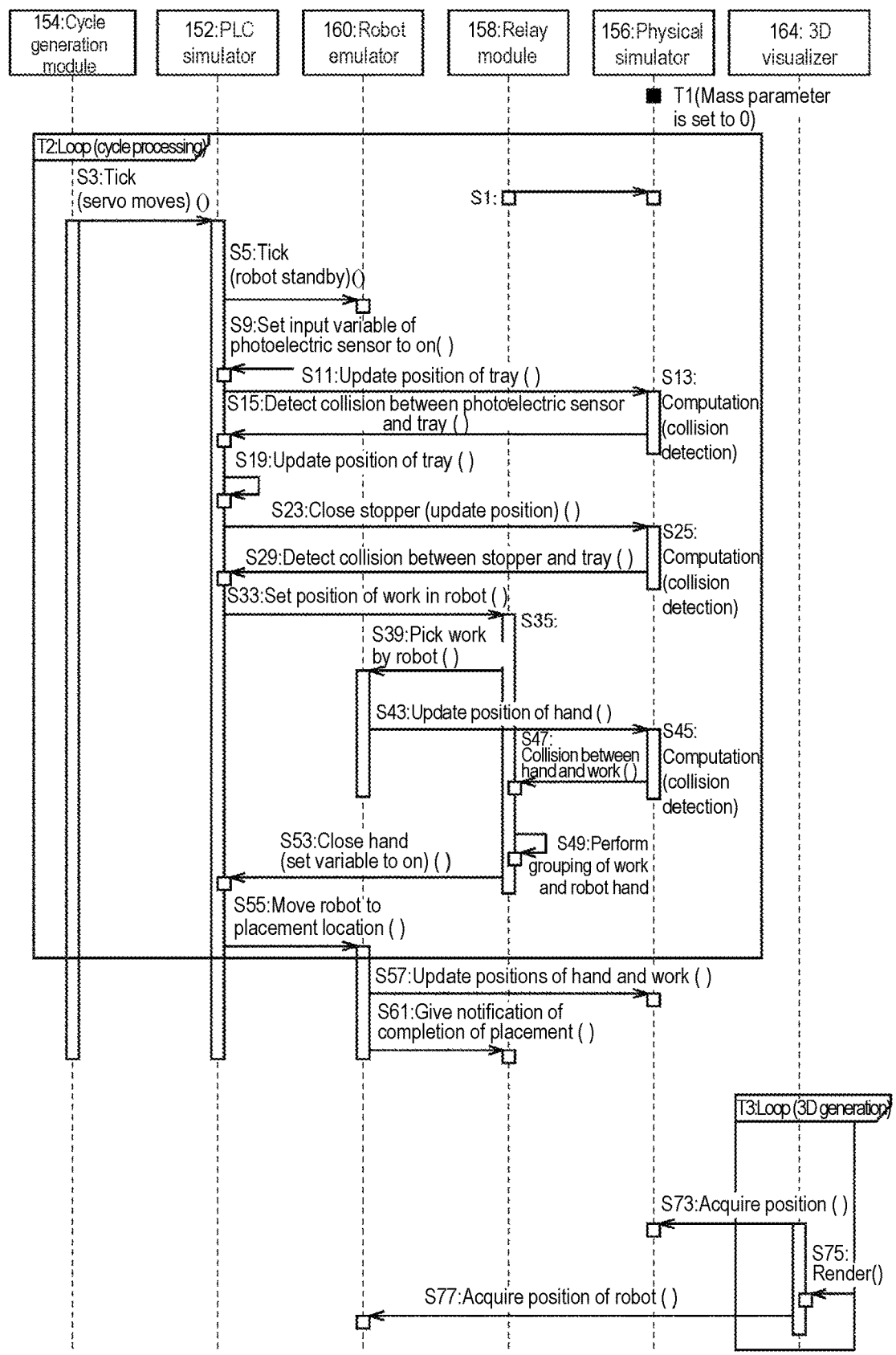
FIG. 7 is a diagram schematically illustrating an example of the sequence of processing of the simulation apparatus 1 according to the present embodiment.

FIG. 7 is a diagram schematically illustrating an example of the sequence of processing of the simulation apparatus 1 according to the present embodiment. In FIG. 7, processing of each part of the simulation apparatus 1 is illustrated in association with data or a command exchanged between the cycle generation module 154, the PLC simulator 152, the robot emulator 160, the relay module 158, and the physical simulator 156. The data exchanged between the parts includes a position corresponding to coordinates of a world coordinate system shared between the parts. In addition, the exchanged data or command may include data or a command exchanged through the virtual space information 105, but the virtual space information 105 and the virtual space information management module 150 are not illustrated in FIG. 7 for the sake of description.

Referring to FIG. 7, the simulation apparatus 1 sets a mass parameter 127 of an object corresponding to the work 232 illustrated in FIG. 6 and a device related to the transport or movement of the work 232, among the physical simulation parameters 124, to zero (step T1). Thereafter, the simulation apparatus 1 starts up each part to start the process of step T2 and the subsequent processes. The process of step T2 is repeatedly executed for each predetermined time step based on the signal ST which is output by the cycle generation module 154. The 3D visualizer 164 performs processing for generating an image for drawing a 3D image on the display 109 at each cycle longer than the time step (step T3). Thereby, the simulation apparatus 1 can generate a 3D image indicating a simulation result on the basis of, for example, the virtual space information 105 and the 3D visualized data 135 indicating results obtained by repeatedly executing the cycle processing in step T2 a plurality of times, and can display the generated 3D image on the display 109.

The cycle generation module 154 is started up when receiving a start-up instruction from a user through the operation unit 106 to start outputting the signal ST. Thereby, the cycle processing in step T2 is started. Further, when the cycle processing is started, the relay module 158 outputs a command for performing initial setting of the position (coordinates) of an object based on the image measurement parameter 129 to the physical simulator 156 (step S1). The physical simulator 156 sets the position (coordinates) of each object to be an initial position included in the virtual space information 105 in response to the instruction.

When the cycle processing (step T2) is started, the cycle generation module 154 outputs an instruction Tick for driving the servomotor (step S3). The PLC simulator 152 executes a simulation program in response to the command Tick received from the cycle generation module 154, generates the instruction Tick for causing the robot 30 to standby and outputs the instruction Tick (step S5), and sets ON as an input variable of the photoelectric sensor 6 (step S9). Thereby, a series of behaviors including movement of the conveyor 230 due to the driving of the servomotors 41 and 42 and detection of the position of the conveyor 230 by the photoelectric sensor 6 is calculated.

Further, the PLC simulator 152 updates the position of the tray 9 on the transport surface in association with the movement of the conveyor 230 (step S11). The physical simulator 156 performs computation processing of collision detection in response to the updating (step S13). Specifically, the physical simulator 156 updates the position of the object of the tray 9 which is set in step S1 by overwriting the position of the tray 9 of the updated virtual space information 105, and detects whether or not the above-described collision has occurred in world coordinate system on the basis of the updated position of the tray 9 and the position of the photoelectric sensor 6 (step S13). Here, the physical simulator 156 detects a collision between the tray 9 and an object of the photoelectric sensor 6. The physical simulator 156 outputs a fact that a collision between the tray 9 and the photoelectric sensor 6 has been detected (step S15).

The PLC simulator 152 updates (changes) the position of the tray 9 so that the tray 9 approaches the stopper 8 in response to the above-described detection of a collision which is output from the physical simulator 156 (step S19), and outputs an instruction for closing the stopper 8 (that is, updating the position of the stopper 8) (step S23).

The physical simulator 156 performs computation processing of collision detection in response to the instruction in step S23 (step S25). Specifically, the physical simulator 156 updates the positions of the objects of the stopper 8 and the tray 9 which are set in step S1 by overwriting the updated position of the virtual space information 105, and detects whether or not the above-described collision has occurred in the world coordinate system on the basis of the updated positions of the tray 9 and positions of the stopper 8 (step S25). Here, the physical simulator 156 detects a collision between the objects of the tray 9 and the stopper 8. The physical simulator 156 outputs a fact that a collision between the tray 9 and the stopper 8 has been detected (step S29).

The PLC simulator 152 outputs an instruction for setting the position of the work 232 in the robot 30 in response to the output from the physical simulator 156 (the detection of a collision between the tray 9 and the stopper 8) (step S33). The position of the work 232 indicates a position based on the updated position of the tray 9 in step S19.

The relay module 158 starts processing for relaying exchange of data for calculating a behavior of picking the work 232 by the robot hand 210 between the physical simulator 156 and the robot emulator 160, in response to the instruction output from the PLC simulator 152 in step S33 (step S35).

Specifically, the relay module 158 outputs an instruction for picking the work 232 by the robot hand 210 (step S39). The robot emulator 160 updates the position of the robot hand 210 on the basis of the position of the work 232 in response to the instruction output from the relay module 158 (step S43).

The physical simulator 156 executes computation of collision detection on the basis of the updated positions of the robot hand 210 and the work 232 (step S45), and detects whether or not the robot hand 210 has collided with the work 232 on the basis of a computation result.

The relay module 158 determines that the robot hand 210 has collided with the work 232 on the basis of an output of the physical simulator 156 (step S47). In response to the determination, the relay module 158 groups information (associates the information with each other) regarding behaviors of objects of the robot hand 210 and the work 232 in the virtual space information 105 (step S49). Then, the relay module 158 sets a variable indicating a state where a hand of the robot hand 210 is closed to be ON (step S53).

The PLC simulator 152 outputs a command for moving the work 232 to a placement location (the position of the table 55) while picking the work 232 in response to the relay module 158 setting the variable of the hand of the robot hand 210 to be ON (step S55). The position of the table 55 is set in the robot emulator 160. Thereby, the process of step T2 in the time step is terminated.

The robot emulator 160 outputs an instruction for updating the positions of the robot hand 210 and the work 232 to the physical simulator 156 in response to the instruction received from the PLC simulator 152 (the command in step S55) (step S57), and outputs a notification indicating the completion of placement to the relay module 158 (step S61). The physical simulator 156 updates the positions of the robot hand 210 and the work 232 included in the physical simulator 156 so as to indicate positions corresponding to the placement positions, in response to the instruction received from the robot emulator 160 (step S57).

Thereafter, in the next time step, the process of step T2 is executed in the same manner as the above-described procedure.

In step T3, the 3D visualizer 164 acquires the positions of the work 232 and the devices (FIG. 6) which are calculated by the physical simulator 156 from the physical simulator 156 (step S73), performs rendering processing on the basis of the acquired positions and the 3D visualized data 135 including data of a corresponding object indicated by the image data 253 (step S75), and acquires a position indicated by the behavior of the robot 30 which is calculated by the robot emulator 160 from the virtual space information 105 (step S77). The 3D visualizer 164 generates data of an image to be drawn on the display 109 from data of the object and the position of the robot 30 after the rendering processing.

In the sequence of FIG. 7, when a collision is not detected in each of the collision detection processes (steps S13, S25, and S45) in the physical simulator 156, the subsequent processing in step T2 may be skipped.

Thereby, the simulation apparatus 1 counts time steps until a collision between the robot hand 210 and the work 232 is detected (step S45), and thus it is possible to estimate a tact time in a case where the control system 2 (FIG. 2) is driven by a simulated PLC program and robot program.

In addition, the physical simulation parameters 124 to be referred to by the physical simulator 156 are switched for each type of robot hand 210, and thus one physical simulator 156 can be shared by a plurality of types of robot hands 210 to be mounted on the robot 30.

In addition, the PLC simulator 152, the robot emulator 160, the relay module 158, and the physical simulator 156 can be time-synchronized with each other on the basis of the signal ST received from the cycle generation module 154, and thus the same collision detection can be reproduced in each simulation in a case where simulation is repeatedly executed.

Further, in FIG. 6, the positions of the robot hand 210 and the work 232 are calculated by the physical simulator 156, but these positions may be calculated by the robot emulator 160. In addition, a user may designate which of the robot emulator 160 and the physical simulator 156 should calculate the positions.

H. Example of Display

Figure 8:
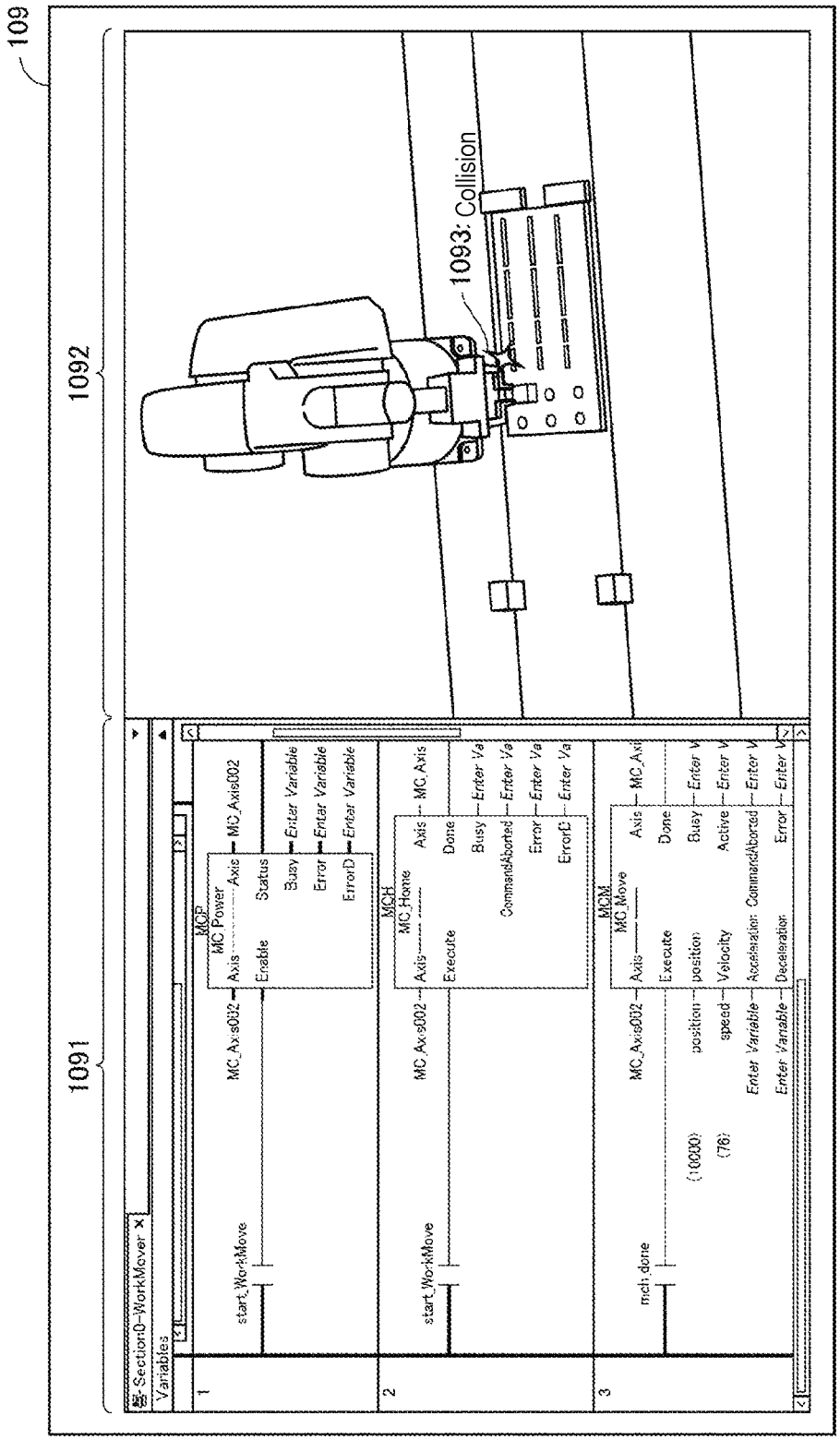
FIG. 8 is a diagram illustrating an example of display according to the present embodiment.

FIG. 8 is a diagram illustrating an example of display according to the present embodiment. FIG. 8 illustrates, for example, a case where the processing of the 3D visualizer 164 is started at a point in time when a collision between the robot hand 210 and the work 232 has been detected. Referring to FIG. 8, a 3D image is drawn in a region 1092 of the display 109 using an image generated by the 3D visualizer 164. In the region 1091 of the display 109 in FIG. 8, a portion of a simulated program is displayed. The 3D image in the region 1092 shows a state where a collision 1093 between the robot hand 210 and the work 232 has been detected (step S45 in FIG. 7).

I. Combination with Real Machine

Figure 9:
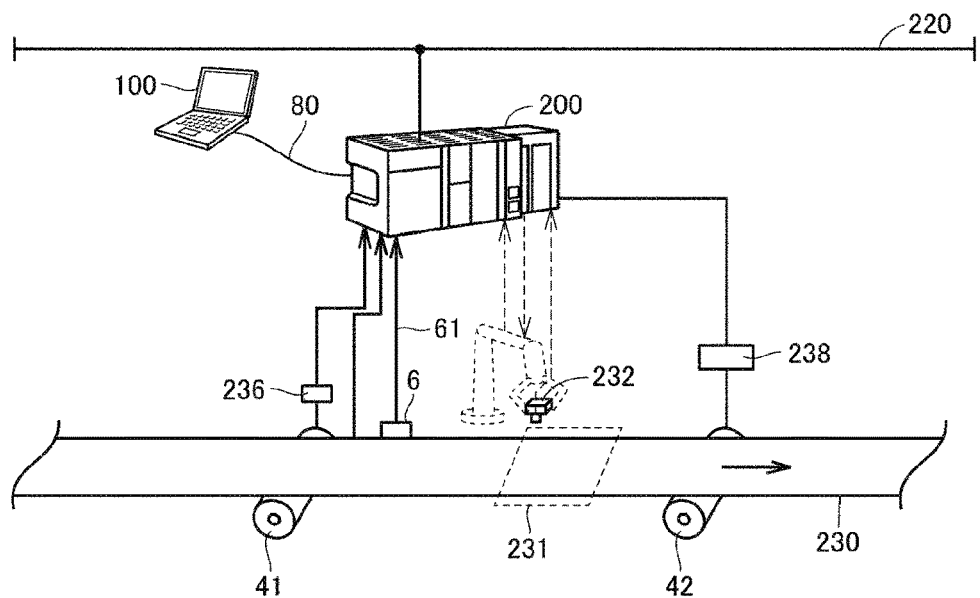
FIG. 9 is a diagram schematically illustrating an example of a combination of the simulation apparatus 1 according to the present embodiment and a real machine.

FIG. 9 is a diagram schematically illustrating an example of a combination of the simulation apparatus 1 according to the present embodiment and a real machine. According to FIG. 9, in a case where a real machine and a virtual device (the PLC 200 or the robot 30) are combined, for example, a behavior of the device related to the picking of the work 232 in a tracking area 231 can be calculated. The calculated behavior is not limited to the behavior related to picking. Specifically, for the robot 30 and the PLC 200 operating in association with the robot 30 while exchanging data (shared data 12A) with the robot 30, the simulation apparatus 1 can set a channel for acquiring data of at least one of the robot 30 and the PLC 200 to be a real machine provided in the production line as illustrated in FIG. 2.

FIG. 9 illustrates a scene in which the information processing apparatus 100 equipped with the simulation apparatus 1 is connected to the PLC 200, which is an example of a real machine, through the network 80. Specifically, the PLC 200 of the real machine is connected to a network 220 of a factory automation (FA) system, but the robot 30 is not connected thereto. The simulation apparatus 1 of the information processing apparatus 100 calculates a behavior of the robot 30 using data received from the PLC 200 of the real machine.

In FIG. 9, the simulation apparatus 1 receives data indicating an instruction value for a device related to the transport of the work 232, and the like from the PLC 200 being in operation as a real machine without starting up the PLC simulator 152 (or instead of the PLC simulator 152), and sets the received data in the virtual space information 105 (shared data 12A). Thereby, in the simulation apparatus 1, while data is exchanged through the virtual space information 105 between the robot emulator 160 and the PLC 200 which is a real machine, a behavior of an object corresponding to the robot 30 which operates in association with the PLC 200 which is a real machine is estimated, and a collision is detected by the physical simulator 156 on the basis of the estimated behavior.

A control cycle related to an operation speed of a real machine is generally shorter than the cycle of a time step of the simulation apparatus 1, and thus the simulation apparatus 1 adjusts the control cycle of the real machine so as to match a time step of simulation in a case where the simulation apparatus 1 is combined with the real machine as illustrated in FIG. 9.

Meanwhile, the combination illustrated in FIG. 9 is a combination of the PLC 200 which is a real machine and the robot emulator 160. However, the present invention is not limited thereto, and the combination may be a combination of the robot 30 which is a real machine and the PLC simulator 152.

J. Simulation of Cable of Robot 30

In the present embodiment, it is possible to provide cable simulation for calculating (reproducing) a behavior of a cable accompanying an operation of the robot 30. In the present embodiment, behaviors of a cable, which is attached to the robot 30 and is able to be mounted on the robot 30, and a device related to the cable are simulated.

Figure 10:
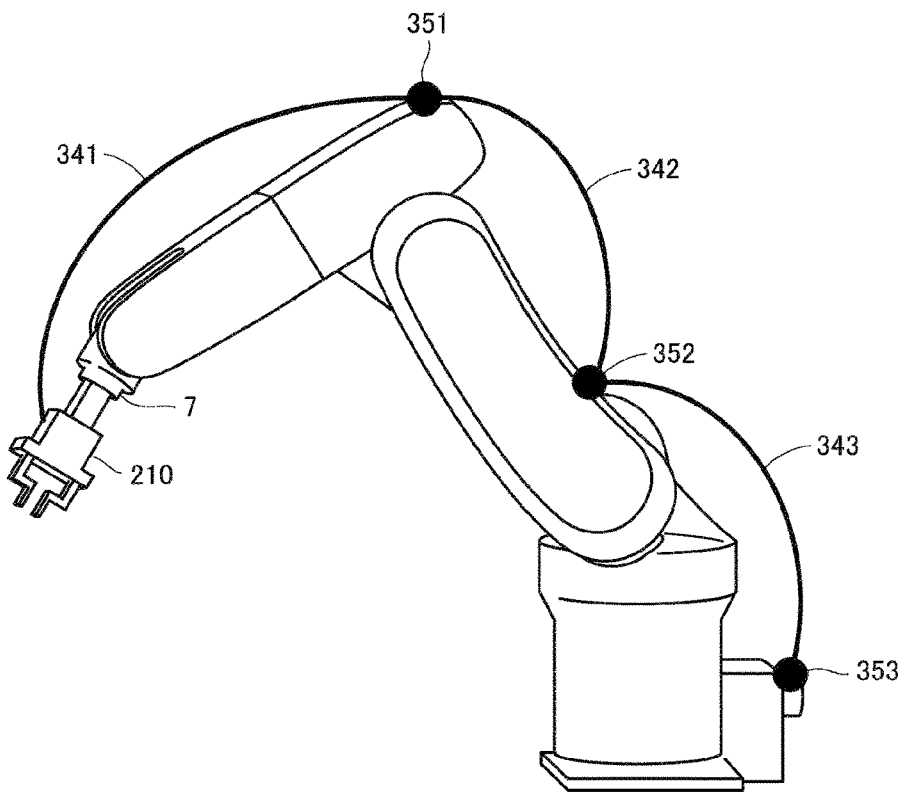
FIG. 10 is a diagram illustrating simulation of a cable attached to a robot 30 according to the present embodiment.

FIG. 10 illustrates a position for guiding a cable, that is, the position of a robot hand 210 and the positions of rings 351, 352, and 353 (also referred to as guide positions), and cables 341, 342, and 343 connecting adjacent guide positions, for example, in an articulated robot 30. The simulation apparatus 1 detects interference between the cables and the robot 30, that is, collisions between the cables and the robot 30 (more specifically, an arm). The rings 351, 352, and 353 and the cables 341, 342, and 343 can be treated as examples of accessory devices mounted on the robot 30.

Specifically, in a case where a behavior of the robot 30 is calculated, the robot emulator 160 calculates the position of the robot hand 210 and the positions (guide positions) of the rings 351, 352, and 353. The physical simulator 156 calculates the positions of the robot hand 210 and the rings 351, 352, and 353 by performing physical computation on the guide positions calculated by the robot emulator 160, in which a mass is set to zero. The physical simulator 156 calculates behaviors (position, posture, and the like) of the cables 341, 342, and 343 using a predetermined function on the basis of the positions calculated in this manner, which a mass is set to zero. The physical simulator 156 detects a collision between the cable and another member (an adjacent cable or the like) on the basis of the calculated positions of the cables 341, 342, and 343.

According to such simulation, even when a real robot 30 is not present, it is possible to detect appropriateness of the lengths and mounting positions (guide positions) of the cables 341, 342, and 343 on the basis of collision detection results of the cables 341, 342 and 343.

K. Appendix

The above-described present embodiment includes the following technical ideas.

[Configuration 1]

A simulation apparatus (1) that calculates a behavior of a device, the simulation apparatus including:

a first behavior calculation unit (160) configured to calculate a behavior of a first target disposed in a virtual space corresponding to a first device (30) equipped with an accessory device (210); and a second behavior calculation unit (158) configured to calculate a behavior of a second target in the virtual space corresponding to a second device, wherein the second device includes the accessory device, and the first behavior calculation unit calculates a behavior of the first target corresponding to the first device equipped with the accessory device at a predetermined time step (ST) for each time step, and then the second behavior calculation unit calculates a behavior of the accessory device mounted on the first device on the basis of the calculated behavior of the first target.

[Configuration 2]

The simulation apparatus according to configuration 1, wherein the accessory device includes a device that adds an operation function of operating a work to the first device by being mounted thereon.

[Configuration 3]

The simulation apparatus according to configuration 1 or 2, wherein the second behavior calculation unit includes a physical simulator.

[Configuration 4]

The simulation apparatus according to configuration 3, wherein the first device includes a robot, and the first behavior calculation unit executes emulation of a robot program having an instruction code for causing the robot to operate a work.

[Configuration 5]

The simulation apparatus according to configuration 3 or 4, wherein the behavior of the first target which is calculated by the first behavior calculation unit includes a position of the first target in the virtual space, and the physical simulator calculates the behavior of the second target in accordance with physical computation using the first position which is calculated by the first behavior calculation unit.

[Configuration 6]

The simulation apparatus according to configuration 5, wherein the physical simulator performs the physical computation by invalidating generation of a force in the second target,

[Configuration 7]

The simulation apparatus according to any one of configurations 1 to 6, wherein the behavior calculated for the second target corresponding to the accessory device includes a position of the second target in the virtual space, and the second behavior calculation unit further detects a collision (1093) between the position of the second target in the virtual space and a position of a predetermined target of the accessory device in the virtual space.

[Configuration 8]

The simulation apparatus according to any one of configurations 1 to 7, further including:

a third behavior calculation unit (152) configured to calculate a behavior of a third target disposed in a virtual space corresponding to a third device (200), wherein the third device operates in associates with the first device while exchanging data with the first device, and the simulation apparatus acquires the data (12A) exchanged between the first device and the third device from a real machine provided in a production line.

[Configuration 9]

The simulation apparatus according to any one of configurations 1 to 8, wherein the accessory device includes a cable that is able to be mounted on the first device.

[Configuration 10]

The simulation apparatus according to any one of configurations 1 to 9, further including:

an image generation part (164) configured to generate an image obtained by visualizing the virtual space.

[Configuration 11]

A simulation program for causing a computer (100) to execute a method of calculating a behavior of a device, the method including a first behavior calculation step of calculating a behavior of a first target disposed in a virtual space corresponding to a first device equipped with an accessory device, and a second behavior calculation step of calculating a behavior of a second target in the virtual space corresponding to a second device, wherein the second device includes the accessory device, and a behavior of the first target corresponding to the first device equipped with the accessory device is calculated in the first behavior calculation step at a predetermined time step for each time step, and then a behavior of the accessory device mounted on the first device is calculated based on the behavior of the first target calculated in the second behavior calculation step.

[Configuration 12]

A simulation method of calculating a behavior of a device, the simulation method comprising:

a first step of calculating a behavior of a first target disposed in a virtual space corresponding to a first device equipped with an accessory device; and a second step of calculating a behavior of a second target in the virtual space corresponding to a second device, wherein the second device includes the accessory device, and a behavior of the first target corresponding to the first device equipped with the accessory device is calculated in the first step at a predetermined time step for each time step, and then a behavior of the accessory device mounted on the first device is calculated in the second step based on the behavior of the first target calculated in the first step.

It should be considered that the embodiment disclosed this time is exemplary in all respects and not restrictive. The scope of the present invention is shown by claims rather than the above description, and is intended to include all modifications within the meaning and scope equivalent to claims.

The invention claimed is:

1. A simulation apparatus, comprising:
a first behavior calculation unit configured to calculate a behavior of a first target disposed in a virtual space corresponding to a first device equipped with an accessory device, wherein the first target is a counterpart of the first device in the virtual space;
a second behavior calculation unit configured to calculate a behavior of a second target in the virtual space corresponding to a second device, wherein the second target is a counterpart of the second device in the virtual space; and a third behavior calculation unit configured to calculate a behavior of a third target disposed in the virtual space corresponding to a third device, wherein the third target is a counterpart of the third device in the virtual space, wherein the second device includes the accessory device, the first behavior calculation unit calculates the behavior of the first target corresponding to the first device equipped with the accessory device in a predetermined time step for each time step, and then the second behavior calculation unit calculates a behavior of the accessory device mounted on the first device based on the calculated behavior of the first target, the first behavior calculation unit, the second behavior calculation unit, and the third behavior calculation unit are synchronized based on a virtual time, so that a same collision detection is reproduced in each simulation in a case where simulation is repeatedly executed, in response to detecting that a collision of the second target has occurred, the third behavior calculation unit is configured to output a command to control a position of the first target in the virtual space, and the simulation apparatus is configured to generate an image visualizing the virtual space in which the respective targets are disposed, and to output the image to a display.

2. The simulation apparatus according to claim 1, wherein the accessory device includes a device that adds an operation function of operating a work to the first device by being mounted thereon.

3. The simulation apparatus according to claim 2, wherein the second behavior calculation unit includes a physical simulator.

4. The simulation apparatus according to claim 3, wherein the first device includes a robot, and
the first behavior calculation unit executes emulation of a robot program having an instruction code for causing the robot to operate the work.

5. The simulation apparatus according to claim 2,
wherein the behavior calculated for the second target corresponding to the accessory device includes a position of the second target in the virtual space, and
the second behavior calculation unit further detects a collision between the position of the second target in the virtual space and a position of a predetermined target in the virtual space.

6. The simulation apparatus according to claim 1, wherein the second behavior calculation unit includes a physical simulator.

7. The simulation apparatus according to claim 6,
wherein the first device includes a robot, and
the first behavior calculation unit executes emulation of a robot program having an instruction code for causing the robot to operate a work.

8. The simulation apparatus according to claim 7,
wherein the behavior of the first target which is calculated by the first behavior calculation unit includes the position of the first target in the virtual space, and
the physical simulator calculates the behavior of the second target in accordance with physical computation using the position of the first target which is calculated by the first behavior calculation unit.

9. The simulation apparatus according to claim 8, wherein the physical simulator performs the physical computation by invalidating generation of a force in the second target.

10. The simulation apparatus according to claim 7,
wherein the behavior calculated for the second target corresponding to the accessory device includes a position of the second target in the virtual space, and
the second behavior calculation unit further detects a collision between the position of the second target in the virtual space and a position of a predetermined target in the virtual space.

11. The simulation apparatus according to claim 6,
wherein the behavior of the first target which is calculated by the first behavior calculation unit includes the position of the first target in the virtual space, and
the physical simulator calculates the behavior of the second target in accordance with physical computation using the position of the first target which is calculated by the first behavior calculation unit.

12. The simulation apparatus according to claim 11, wherein the physical simulator performs the physical computation by invalidating generation of a force in the second target.

13. The simulation apparatus according to claim 11,
wherein the behavior calculated for the second target corresponding to the accessory device includes a position of the second target in the virtual space, and
the second behavior calculation unit further detects a collision between the position of the second target in the virtual space and a position of a predetermined target in the virtual space.

14. The simulation apparatus according to claim 6,
wherein the behavior calculated for the second target corresponding to the accessory device includes a position of the second target in the virtual space, and
the second behavior calculation unit further detects a collision between the position of the second target in the virtual space and a position of a predetermined target in the virtual space.

15. The simulation apparatus according to claim 1,
wherein the behavior calculated for the second target corresponding to the accessory device includes a position of the second target in the virtual space, and
the second behavior calculation unit further detects a collision between the position of the second target in the virtual space and a position of a predetermined target in the virtual space.

16. The simulation apparatus according to claim 1, further comprising:
wherein the third device operates in association with the first device while exchanging data with the first device, and
the simulation apparatus acquires the data exchanged between the first device and the third device from a real machine provided in a production line.

17. The simulation apparatus according to claim 1, wherein the accessory device includes a cable that is able to be mounted on the first device.

18. The simulation apparatus according to claim 1, further comprising:
an image generation part configured to generate an image obtained by visualizing the virtual space.

19. A non-transient computer-readable recording medium, recording a simulation program for causing a computer to execute a method of calculating a behavior of a device, the method comprising:
a first behavior calculation step of calculating a behavior of a first target disposed in a virtual space corresponding to a first device equipped with an accessory device, wherein the first target is a counterpart of the first device in the virtual space;
a second behavior calculation step of calculating a behavior of a second target in the virtual space corresponding to a second device, wherein the second target is a counterpart of the second device in the virtual space; and a third behavior calculation step of calculating a behavior of a third target disposed in the virtual space corresponding to a third device, wherein the third target is a counterpart of the third device in the virtual space, wherein the second device includes the accessory device, the behavior of the first target corresponding to the first device equipped with the accessory device is calculated in the first behavior calculation step at a predetermined time step for each time step, and then a behavior of the accessory device mounted on the first device is calculated based on the behavior of the first target calculated in the second behavior calculation step, the first behavior calculation step, the second behavior calculation step, and the third behavior calculation step are synchronized based on a virtual time, so that a same collision detection is reproduced in each simulation in a case where simulation is repeatedly executed, in response to detecting that a collision of the second target has occurred, the third behavior calculation step outputting a command to control a position of the first target in the virtual space, and the method comprising a step of generating an image visualizing the virtual space in which the respective targets are disposed, and a step of outputting the image to a display.

20. A simulation method of calculating a behavior of a device, the simulation method comprising:

a first step of calculating a behavior of a first target disposed in a virtual space corresponding to a first device equipped with an accessory device, wherein the first target is a counterpart of the first device in the virtual space;

a second step of calculating a behavior of a second target in the virtual space corresponding to a second device, wherein the second target is a counterpart of the second device in the virtual space; and a third step of calculating a behavior of a third target disposed in the virtual space corresponding to a third device, wherein the third target is a counterpart of the third device in the virtual space, wherein the second device includes the accessory device, the behavior of the first target corresponding to the first device equipped with the accessory device is calculated in the first step at a predetermined time step for each time step, and then in the second step, a behavior of the accessory device mounted on the first device is calculated based on the behavior of the first target calculated in the first step, the first step, the second step, and the third step are synchronized based on a virtual time, so that a same collision detection is reproduced in each simulation in a case where simulation is repeatedly executed, in response to detecting that a collision of the second target has occurred, the third step outputting a command to control a position of the first target in the virtual space, and the simulation method comprising a step of generating an image visualizing the virtual space in which the respective targets are disposed, and a step of outputting the image to a display.

* * * * *